(12) United States Patent
Hirose et al.

(10) Patent No.: US 6,286,793 B1
(45) Date of Patent: Sep. 11, 2001

(54) POP-UP STRUCTURE

(75) Inventors: Tsugio Hirose, Isehara; Toshihiro Hara, Zama; Mutsuhisa Masaki, Komaki; Tohru Sambonmatsu, Toyota, all of (JP)

(73) Assignees: Nifco Inc.; Nissan Motor Co., Ltd., both of Yokohama; Mitsuboshi Belting Ltd., Kobe, all of (JP)

( * ) Notice: Subject to any disclaimer, the term of this patent is extended or adjusted under 35 U.S.C. 154(b) by 0 days.

(21) Appl. No.: 09/466,804

(22) Filed: Dec. 20, 1999

(30) Foreign Application Priority Data

Dec. 21, 1998 (JP) .................................................. 10-363099

(51) Int. Cl.[7] ...................................................... B68G 5/00

(52) U.S. Cl. .................................. 248/118; 292/1; 292/95; 296/37.8; 297/411.36; 297/411.38

(58) Field of Search .................................. 248/118, 287.1, 248/278.1, 282.1; 296/37.8, 37.1; 297/411.2, 411.35, 411.36, 411.38; 292/1, 95, 109

(56) References Cited

U.S. PATENT DOCUMENTS

| | | | |
|---|---|---|---|
| 4,934,750 | * | 6/1990 | Eichler et al. ...................... 296/37.8 |
| 5,066,068 | * | 11/1991 | Suzuki et al. ........................ 296/221 |
| 5,636,899 | * | 6/1997 | Schiff et al. ..................... 297/411.36 |
| 5,722,703 | * | 3/1998 | Iwamoto et al. .......................... 292/1 |
| 5,749,629 | * | 5/1998 | Heath et al. .................... 297/411.36 |
| 6,003,927 | * | 12/1999 | Korber et al. ...................... 296/37.8 |

* cited by examiner

*Primary Examiner*—Leslie A. Braun
*Assistant Examiner*—Tan Le
(74) *Attorney, Agent, or Firm*—Kanesaka & Takeuchi

(57) ABSTRACT

In a pop-up structure of the invention, an elevatable member is rotatably disposed on upper portions of a pair of front and rear poles, which is also rotatably provided on a base member. Shielding plates extend between the front and rear poles on both sides thereof. In case the elevatable member is elevated by rotating both poles, even if an elevating height of the elevatable member is high, at least a part of the space formed between the front and rear poles is covered by the shielding plates at the both sides. Therefore, the appearance at the popped-up state of the pop-up structure is improved, and there is no risk of catching foreign materials by the poles or the like when it is collapsed.

6 Claims, 20 Drawing Sheets

POP-UP STRUCTURE

BACKGROUND OF THE INVENTION AND RELATED ART STATEMENT

The invention relates to a pop-up structure suitable as a height controlling mechanism of an armrest or the like built in the armrest in a central console box or an armrest for rear seats in a car, and in particular, to a pop-up structure wherein an elevatable member is rotatably attached to at least a pair of front and rear poles rotatably provided on a base member to constitute a link mechanism, and the elevatable member is elevated or lowered by allowing the poles to stand uprightly or collapse through rotation.

Heretofore, in a car, a central console box a, as shown in FIG. 21, has been provided between a driver's seat and a passenger's seat. Recently, an elevatable member, not shown in FIG. 21, operated by a button is provided to a covering member b of the central console box a, and an armrest e is attached to the elevatable member, so that the console box a is used as the armrest by elevating the same through the elevatable member.

In the console box used as the armrest as described above, there has been disclosed a pop-up structure for elevating or lowering the elevatable member as shown in FIGS. 22 to 24(D). More specifically, the pop-up structure is constructed such that poles c, d positioned with a predetermined space therebetween are collapsibly attached on the covering member b of the console box a as a base member; an elevatable member f, to which the armrest e is attached, is rotatably connected to upper edge portions of the poles c, d, to form a link mechanism; torsion springs h are respectively disposed between the pole c and a base portion g fixed to the covering member b, and between the pole d and the base portion g, to thereby urge both poles c, d in a standing-up direction; and a long-plate-shape locking piece i for locking the poles c, d in a collapsed state where the poles c, d collapse, as shown in FIG. 22, and locking the poles c, d in a popped-up state where the poles c, d stand straight, as shown in FIG. 23, is attached to the elevatable member f slidably in the front-rear direction (left-right direction in the drawing) and is urged forwards by a coil spring j.

In the pop-up structure, as shown in FIG. 22, in the collapsed state where both poles c, d are collapsed to be located on the covering member b against the urging forces of the torsion springs h, a forward edge formed in a hook shape of a locking projection k projected from an upper surface of the covering member b engages a locking hole m provided in the locking piece i to thereby lock both poles c, d in the collapsed state against the urging forces of the torsion springs h. At this time, the locking piece i is positioned at a forward (left side in the drawing) moving limit by the urging force of the coil spring j, and a locking projection n projecting from the forward edge of the locking piece i is inserted in a pushing-in depressed portion o with an approximately right-angle fan shape in section formed at an upper edge of the front pole c.

From this state, in case the elevatable member f is elevated to use the armrest e, a lock releasing piece s integrally extending from a forward edge of the locking piece i and projecting from a front edge of the armrest e is pushed (P1). Thereupon, as shown in FIG. 24(A), the locking piece i slides rearwards (right side in the drawing) and engagement between an edge portion of the locking hole m provided at the locking piece i and the locking projection k is released to thereby release the locking state. Thus, both poles c, d are rotated in the standing-up direction by the urging forces of the torsion springs h and the elevatable member f is elevated by the action of the link mechanism. At the same time, as shown in FIG. 24(B), since the pushing force P1 is released, a locking projection n of the locking piece i was moved to the front side (left side in the drawing) by the urging force of the coil spring j, but the locking projection n is pushed rearwards in the inner side of the pushing-in depressed portion o by a rotational movement of the pole c, and the locking piece i again slides rearwards. When the pole c is rotated to stand straight, an engaging depressed portion r formed on an inner surface of the upper edge of the pole c accords with the locking projection n; as shown in FIG. 23, the locking piece i is again moved forwards (left side in the drawing) by the urging force of the coil spring j; the locking projection n is inserted into the engaging depressed portion r to engage therewith; and both poles c, d are locked in the popped-up state where they stand straight.

Further, from the popped-up state, in case the elevatable member f is lowered to return to the collapsed state as shown in FIG. 22, the lock releasing piece s is again pushed (P2), and the locking piece i slides rearwards (right side in the drawing). Thus, the locking projection n provided at the locking piece i slips out of the engaging depressed portion r of the pole c to thereby release the locked state. Under the state, the elevatable member f is pressed downward to rotate both poles c, d rearwards while collapsing by the action of the link mechanism, and the forward edge of the locking projection k abuts against a tapered portion formed on a lower surface side of the rear edge of the locking hole m of the locking piece i which has been moved forwards (left side in the drawing) through release of the pressing force P2, as shown in FIG. 24(D). Under the state, when the elevatable member f is further lowered by pressing P3, after the locking piece i once slides rearwards by the action of the tapered portion and the locking projection k is inserted into the locking hole m, the locking piece i again slides forwards by the urging force of the coil spring j and the locking projection k engages the locking hole m to thereby lock in the collapsed state, as shown in FIG. 22.

As described above, according to the pop-up structure, the elevatable member f is automatically elevated by pushing the lock releasing piece s so that the armrest e attached to the covering member b of the central console box a can be comfortably used, and after the use, the lock releasing piece s is pressed to release the locked state and lower the elevatable member f to collapse the same.

However, in case the prior pop-up structure is used as the armrest where the elevatable member f is elevated to the popped-up state, there has been a problem that a space formed between both poles c, d in the popped-up state is seen or exposed.

More specifically, as shown by single-dotted chain lines and two-dotted chain lines in FIGS. 22 and 23, normally, the armrest e and covering member b attached to the elevatable member f are covered by covers w and x made of an interior material, such as a resin sheet and fabric. While, in the collapsed state as shown in FIG. 22, the inner pop-up mechanism is covered by the covers w and X, but in the popped-up state as shown in FIG. 23, a large space between the cover w for the armrest e attached to the raised elevatable member f and the cover x for the covering member k is formed, so that the space between both poles c, d and the inner mechanism are exposed to thereby deteriorate the appearance of the unit, and there is also a risk of catching foreign materials in the space when the armrest is collapsed by lowering the elevatable member f.

In this case, it is considered that both covers w, x are made larger so that when the armrest is collapsed, both covers overlaps each other to thereby slightly improve the situation. However, in the method, it is limited to fully cover the whole side surfaces in the popped-up state. In other words, the elevating height of the armrest e is limited, so that the armrest e may not be elevated to an extent where the armrest can be used comfortably.

In view of the above defects, the present invention has been made, and an object of the invention is to provide a pop-up structure, wherein even if the elevating height of the elevatable member is taken greatly, the space formed between the front pole and rear pole in the popped-up state can be at least partly covered to thereby improve the appearance of the armrest when it is popped up, and at the same time, possibility of catching foreign materials between the elevatable member and the base member when it is collapsed can be reduced.

Further objects and advantages of the invention will be apparent from the following description of the invention.

SUMMARY OF THE INVENTION

In order to attain the above objects, according to one aspect of the invention, there is provided a pop-up structure including a base member; at least a pair of front and rear poles, each one end being rotatably connected on an upper surface of the base member to stand straight or collapse on the upper surface of the base member; an elevatable member rotatably attached to each other end of the poles; a locking device for locking rotation of the respective poles in a collapse state where the poles collapse and in a popped-up state where the poles stand straight on the base member; and shielding plates rotatably connected to the front and rear poles at both edges thereof. At least a part of the space formed between the front and rear poles in the popped-up state is covered by the shielding plates.

In the collapsed state, the poles collapsed on the base member are locked by the locking device, but the poles are released by actuating the locking device. In the popped-up state, the poles stand straight, and is locked by the locking device to hold the popped-up state where the elevatable member is elevated from the base member. This popped-up state is released by the locking device to rotate the poles, so that the poles are collapsed on the base member to hold the collapsed state.

In the pop-up structure, in the same manner as described in the conventional structure, the elevatable member is rotatably provided at the upper edge portions of the pair of the front and rear poles collapsibly provided on the upper surface of the base member to constitute a link mechanism. By rotating the poles to stand straight or collapse, the elevatable member is elevated or lowered, and the respective poles are locked in the popped-up state or in the collapsed state.

In this case, in the pop-up structure according to the present invention, the space formed between the front pole and the rear pole in the popped-up state is at least partly covered from the side surfaces by the shielding plates attached between the front and rear poles. For example, in case the armrest disposed on the covering member of the console box is elevated, the space formed between the cover of the covering member and the cover of the armrest in the popped-up state is closed by the shielding plates.

More specifically, since both edges of the shielding plates are rotatably connected to intermediate portions of the front and rear poles to constitute a link mechanism, the shielding plates are elevated or lowered together with the elevating or lowering movement of the elevatable member accompanying the standing-up or collapsing movement of both poles. Therefore, when it is popped up, the space formed between the cover of the armrest and the cover of the covering member is closed by the shielding plates, while when it is collapsed, the shielding plates are located along the collapsed poles and housed inside the covers of the armrest and the covering member.

Thus, according to the pop-up structure of the invention, even if the elevating height of the elevatable member is taken greatly at the popped-up state, at least a part of the space formed between the front and rear poles is covered by the shielding plates. Therefore, the appearance of the armrest when it is popped up can be improved, and there is no risk of catching foreign matters between the poles or the like when it is collapsed.

Also, according to the second aspect of the invention, in the connecting portions between the respect shielding plates and the respective poles, at least one connecting portion of the shielding plate with respect to one pole is rotatable and slidable in the front-rear direction.

According to the pop-up structure of the third aspect of the invention, even if the lengths of the front pole and the rear pole are different and distances of the portions for connecting the shielding plate and the poles in the popped-up state are different in the front pole and rear pole, since one of the connecting portions between the shielding plate and the poles is slidable in the front-rear direction, the elevating or lowering movement of the elevatable member can be smoothly carried out.

Incidentally, in the invention, "front" means a direction that the poles rise or move when it is popped up, while "rear" means a direction that the poles collapse or move when it is collapsed.

BRIEF DESCRIPTION OF THE DRAWINGS

FIG. 21 is a perspective view showing a conventional central console box where the pop-up unit is built in;

DETAILED DESCRIPTION OF PREFERRED EMBODIMENTS

Hereunder, embodiments of the invention are described specifically.

Figure 21:
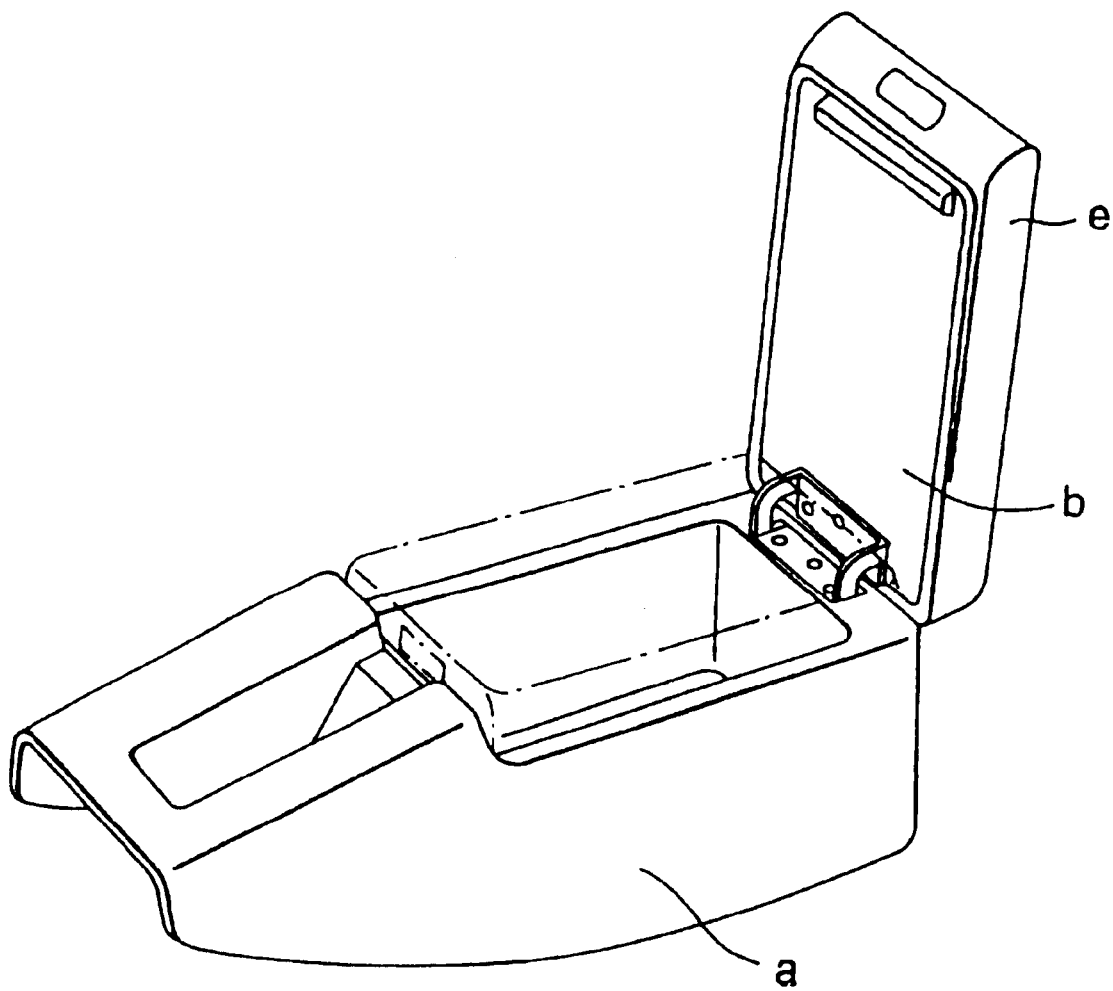
Figure 22:
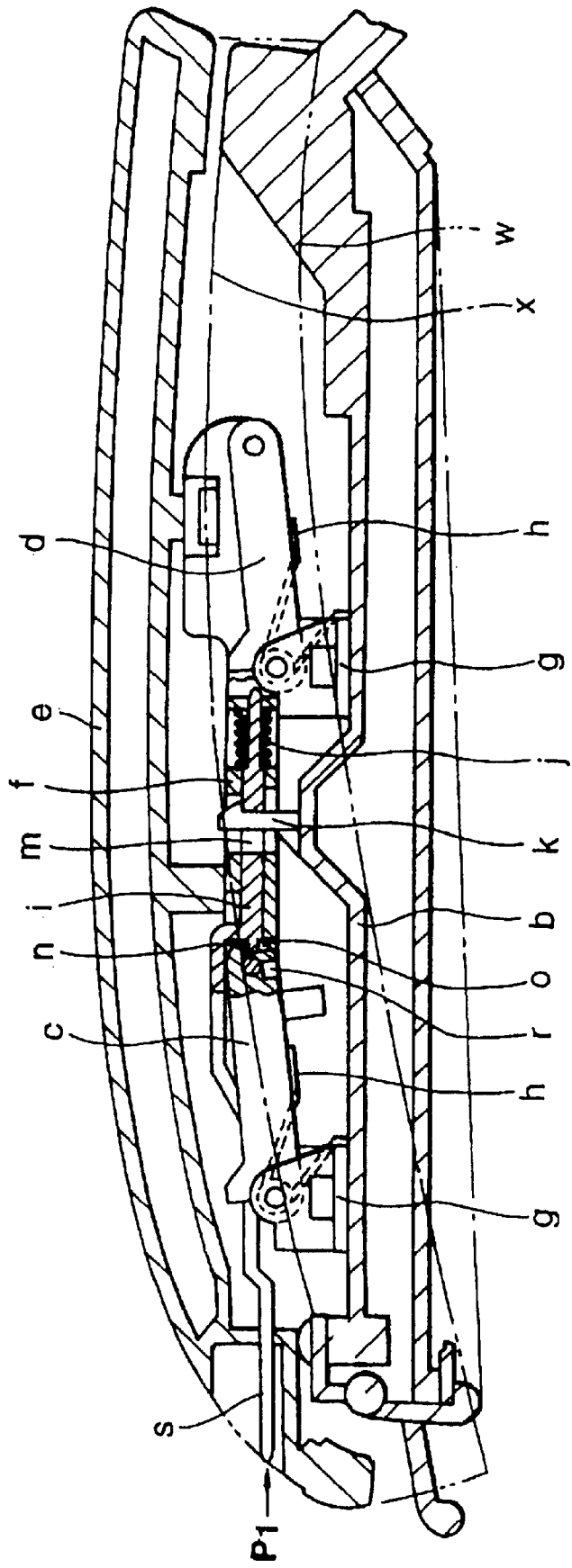
FIG. 22 is a side view, partially cut to show as a section, showing a collapsed state of a conventional pop-up mechanism.
Figure 23:
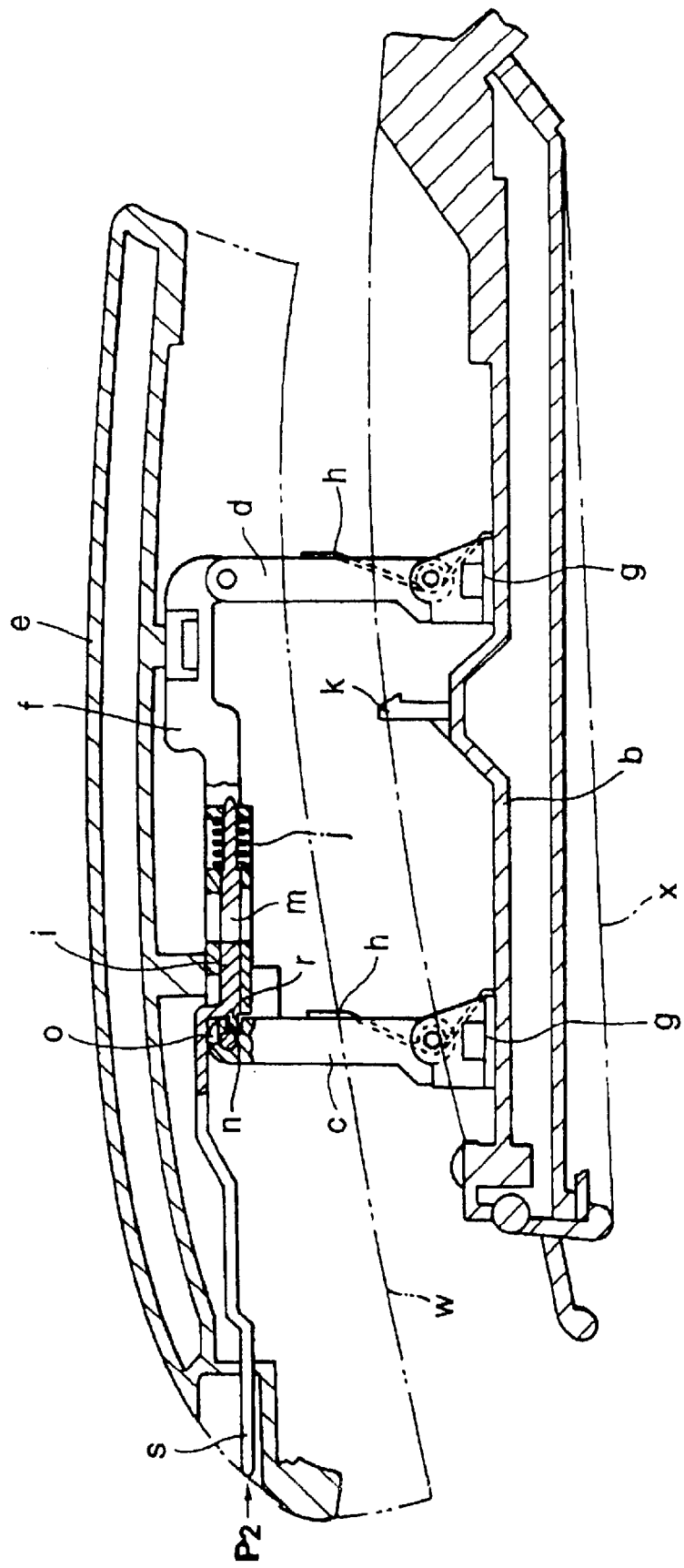
FIG. 23 is a side view, partially cut to show as a section, showing a popped-up state thereof.
Figure 24A:
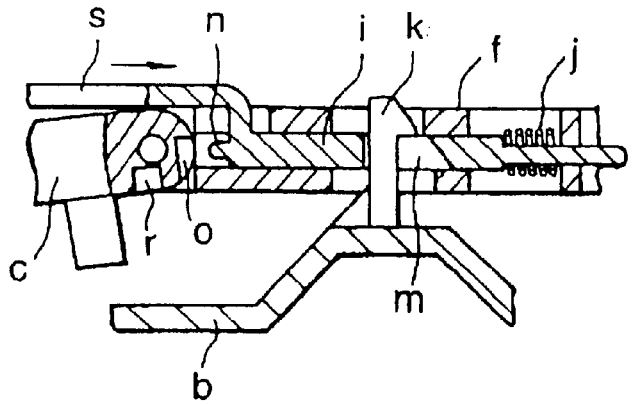
FIGS. 24(A), 24(B), 24(C) and 24(D) are enlarged sectional views for explaining locking movements of the conventional pop-up mechanism.
Figure 24B:
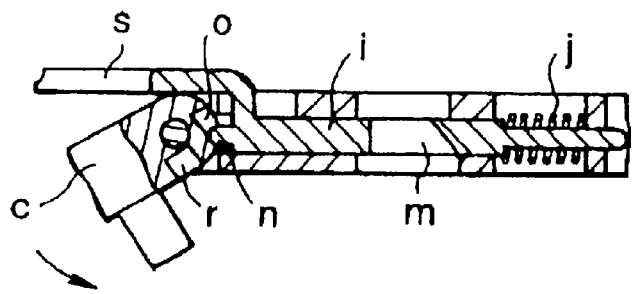
Figure 24C:
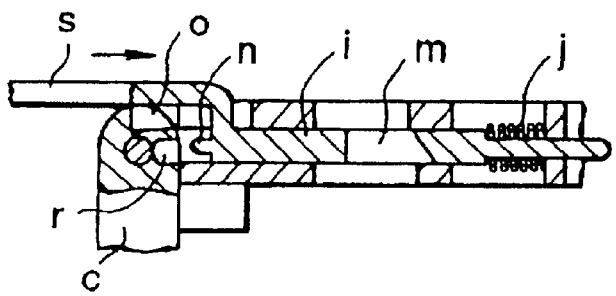
Figure 24D:
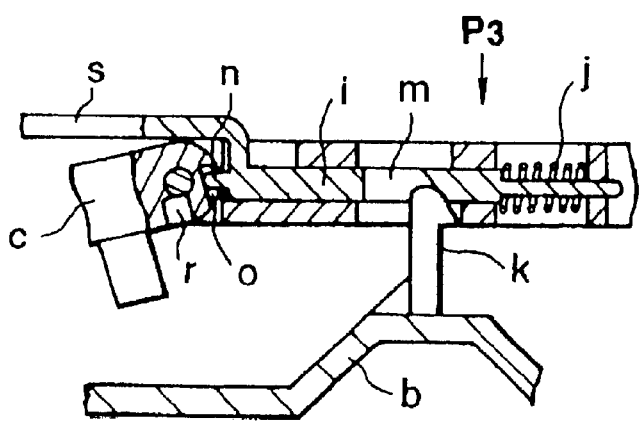

FIGS. 1 to 8 show a pop-up unit provided with a pop-up structure of the embodiment according to the invention. The pop-up unit is built in between a covering member b and an armrest e disposed over the covering member b, in a central console box a as shown in FIG. 21. The pop-up mechanism includes a base member 1 to be fixed to the covering member b; a pair of poles 2a, 2b disposed in front and rear portions on the base member 1 in an elevatable or collapsible manner; and a plate shape elevatable member 3 rotatably connected to upper ends of the poles 2a, 2b.

In the base member 1, as shown in FIGS. 9 to 12, front leg connecting portions 12, each having an approximately semi-circular section with a shaft hole 121, are projected from both corners of one end portion on an upper surface side of the base plate 11 in an approximately flat-board shape, and from both corners of the other end portion thereof, rear leg connecting portions 13, each having an approximately right-angle fan plate shape with shaft hole 131, are projected. At the center on the upper surface side of the base member 1, a locking projection 14 provided with a locking claw 14a in a hook shape at its forward edge is disposed. Incidentally, a circular arc edge portion of each rear leg connecting portion 13 constitutes a rack gear 13a to engage a pinion gear 25b of an oil damper 24b described later.

Also, on a slightly front side, i.e. left side in the drawing, from the center in the longitudinal direction of the base plate 11, a through window 15 for allowing a locking member 5, described later, to enter therein when the pop-up structure is collapsed, is formed. Also, attaching pieces 16 extend outwards from the four corner portions of the base plate 11, respectively, and include bosses 16a for fixing the base member 1 to the covering member b of the central console box, respectively. Incidentally, in the drawing, reference numeral 15a represents a locking member engaging projection projecting toward the center of the through window 15 from the center of the rear edge side thereof, and a square projection 55 of the locking member 5, described later, abuts against the engaging projection 15a to thereby prevent the locking member 5 from protruding outwards from a bottom surface of the base member 1.

In the poles 2a, 2b attached on the upper surface of the base member 1, as shown in FIGS. 17 and 18, thick plate-shape pole main portions 21a, 21b are integrally provided with leg projecting portions 22a, 22b having shaft inserting holes on both sides of the lower edge thereof, and at the same time, are integrally provided with elevatable member connecting projections 23a, 23b having shaft inserting holes on both sides of the upper edge thereof, respectively.

Figure 17A:
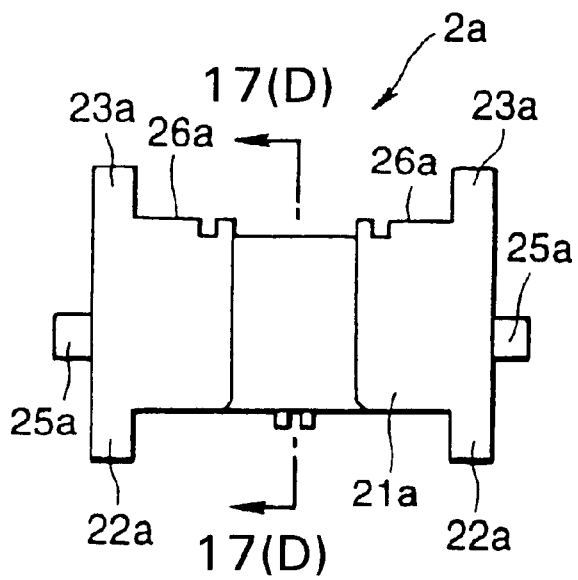
FIG. 17(A) is a front view of a front pole for constituting the pop-up unit.
Figure 17B:
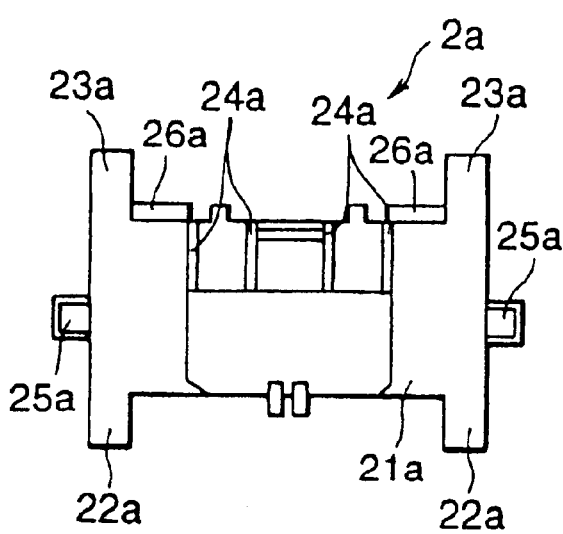
FIG. 17(B) is a rear view thereof.
Figure 17C:
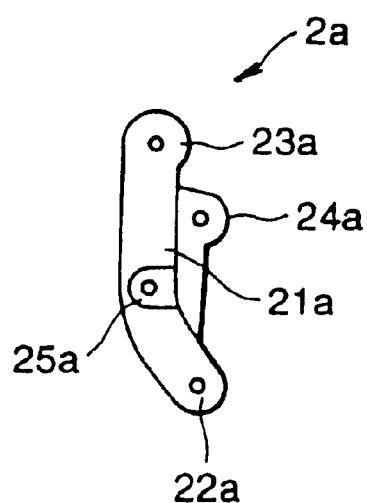
FIG. 17(C) is a side view thereof.
Figure 17D:
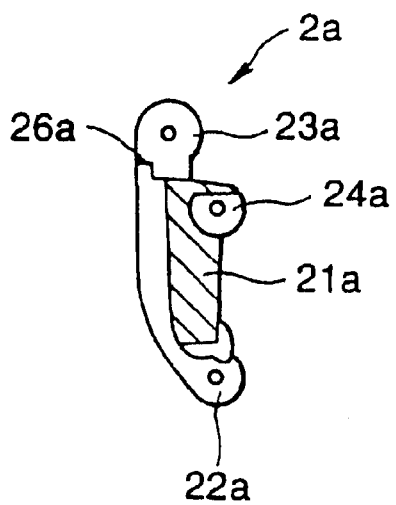
FIG. 17(D) is a sectional view taken along line 17(D)—17(D) in FIG. 17(A)

In the poles 2a and 2b, the front pole 2a, i.e. the left pole in FIGS. 1 to 8 is provided with two pairs of locking member connecting projections 24a having a predetermined space therebetween, respectively, as shown in FIG. 17(B), on the back or rear side of the pole main portion 21a, i.e. on an inner side when it is assembled. The locking member 5, described later, is attached to the locking member connecting projections 24a. Also, both side surfaces of the front pole 2a are provided with shielding plate connecting bosses 25a to be connected to attaching projections 71 of shielding plates 7 described later. Incidentally, in FIGS. 17(A) and 17(B), reference numeral 26a represents rotation terminating pieces for terminating a rotational movement by allowing the rotation terminating pieces to abut against the front edge of the elevatable member 3 when the pole 2a is rotated to stand straight.

Figure 18A:
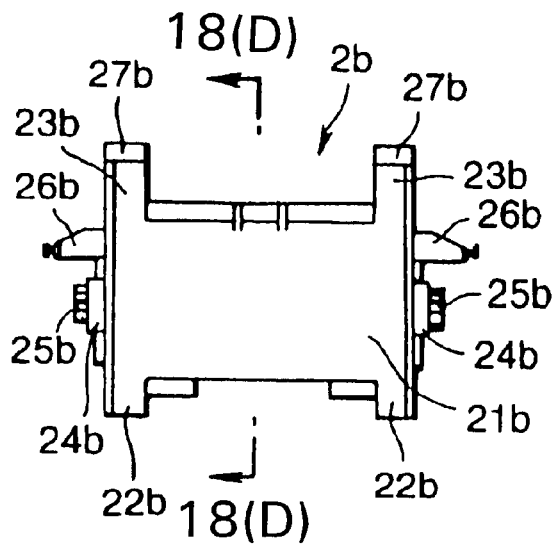
FIG. 18(A) is a front view of a rear pole for constituting the pop-up unit.
Figure 18B:
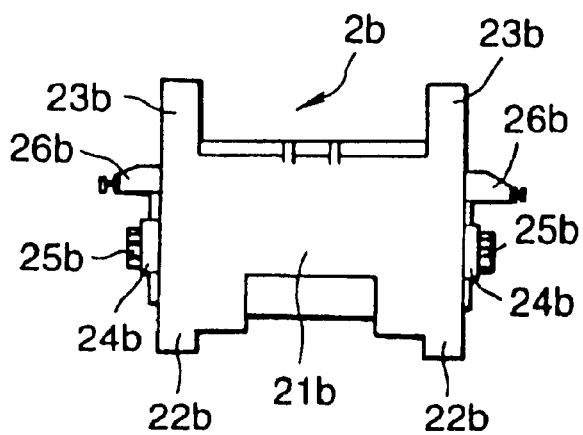
FIG. 18(B) is a rear view thereof.
Figure 18C:
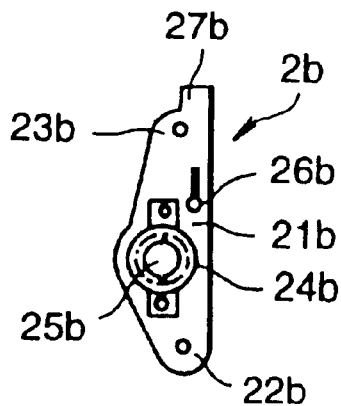
FIG. 18(C) is a side view thereof.
Figure 18D:
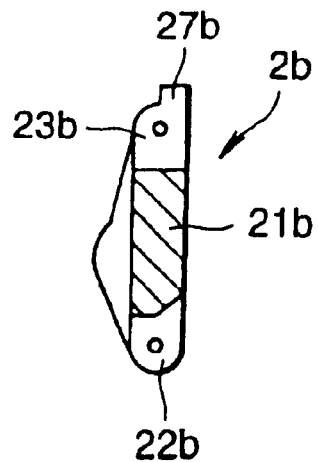
FIG. 18(D) is a sectional view taken along line 18(D)—18(D) in FIG. 18(A)

On the other hand, the rear pole 2b, i.e. the right side pole in FIGS. 1 to 8, is provided with oil dampers 24b having pinion gears 25b at the central portions on both side surfaces thereof, as shown in FIGS. 18(A) and 18(B), and at slightly upper portions thereof, shielding plate attaching projections 26b to be connected to connecting bosses 72 of the shielding plates 7 described later, respectively. Incidentally, reference numeral 27b in FIGS. 18(A), 18(C), 18(D) represents rotation terminating pieces for terminating a rotational movement by allowing the rotation terminating pieces 27b to abut against the rear edge of the elevatable member 3 when the pole 2b is rotated to the upright position, to thereby stop the rotational movement.

In the above-described poles 2a, 2b, distances between the shaft inserting holes provided on the upper and lower edge portions are different, and the distance between the shaft inserting holes of the front pole 2a is set to be longer than that between the shaft inserting holes of the rear pole 2b.

Figure 1:
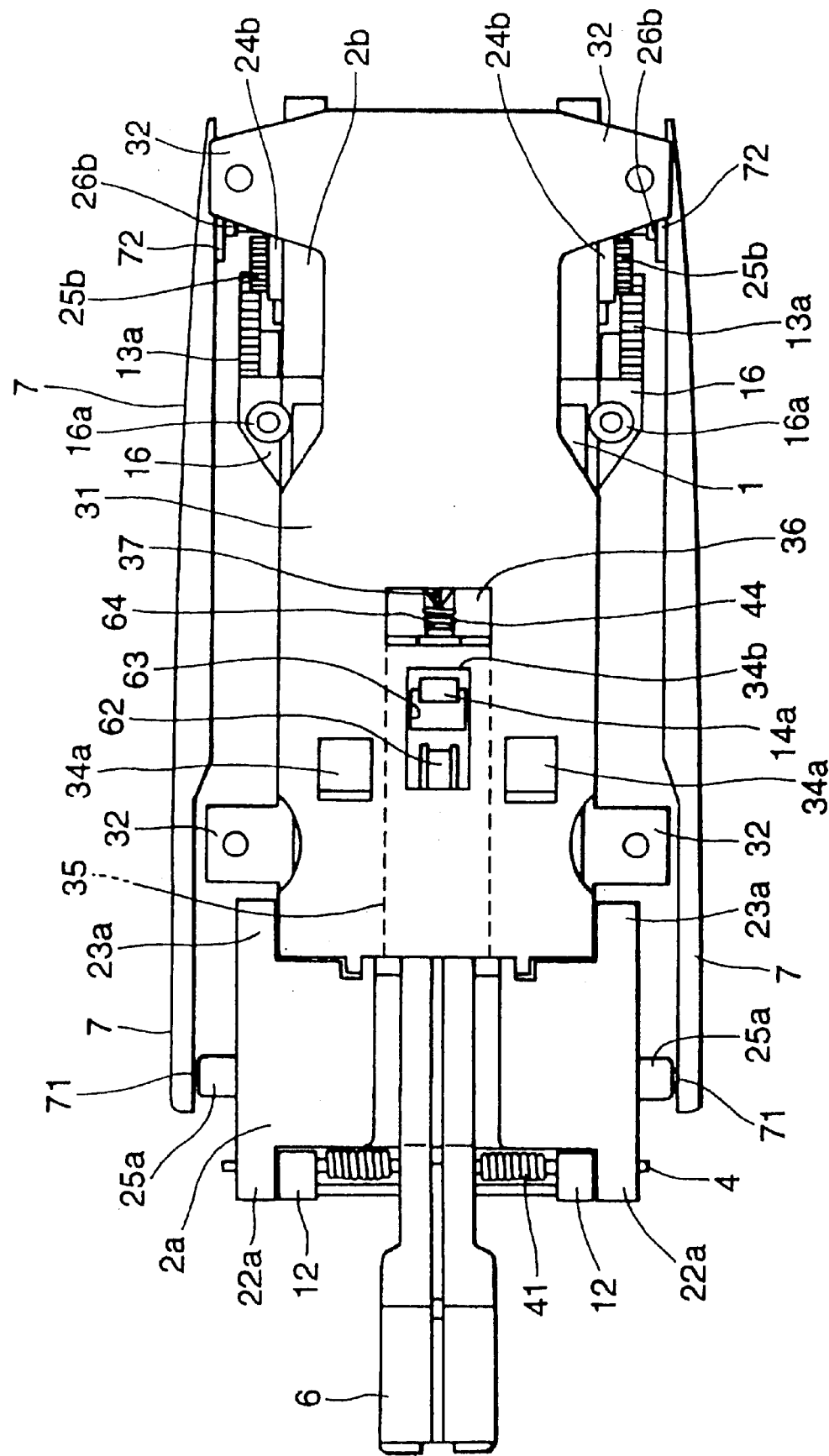
FIG. 1 is a plan view showing a collapsed state of a pop-up unit using a pop-up mechanism according to the present invention.
Figure 5:
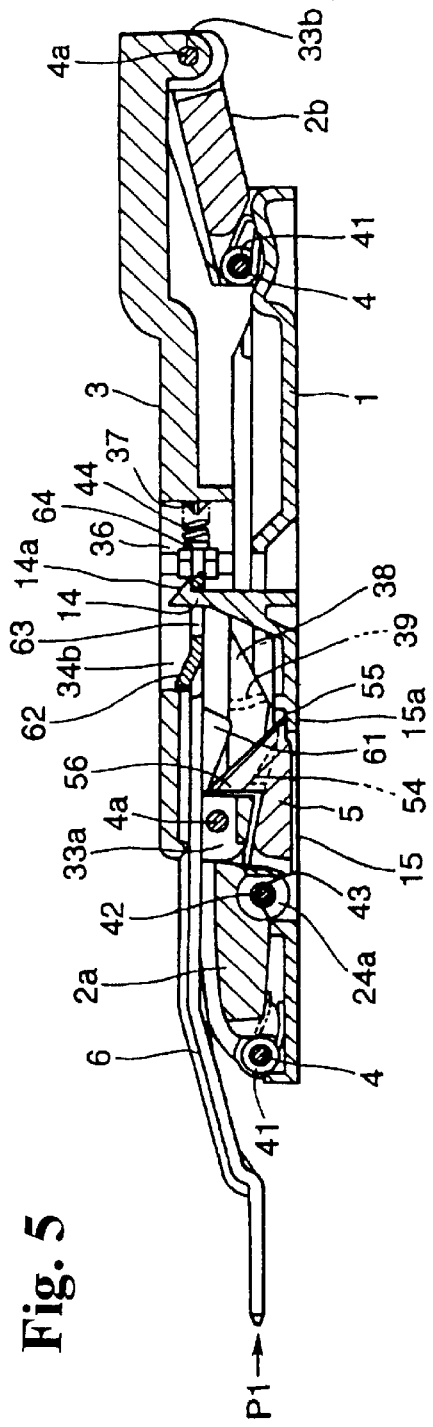
FIG. 5 is a sectional view of the collapsed state.
Figure 6:
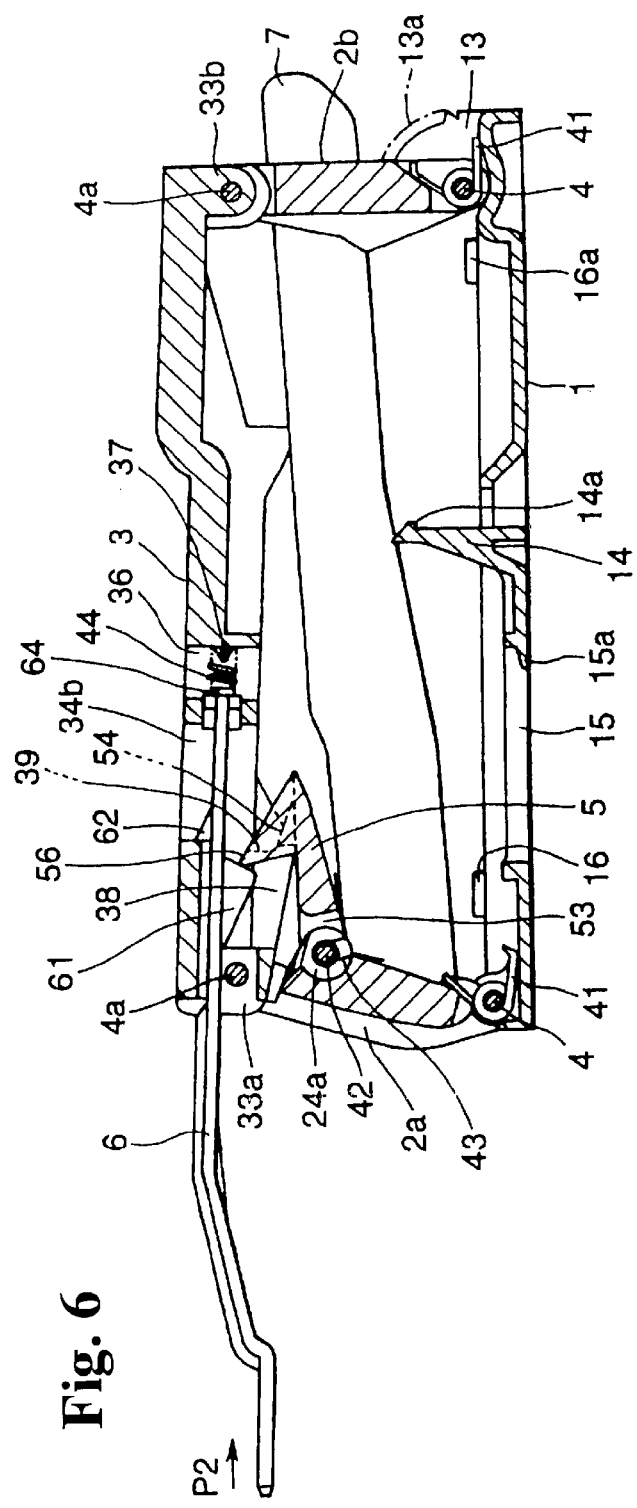
FIG. 6 is a sectional view of the popped-up state.
Figure 9:
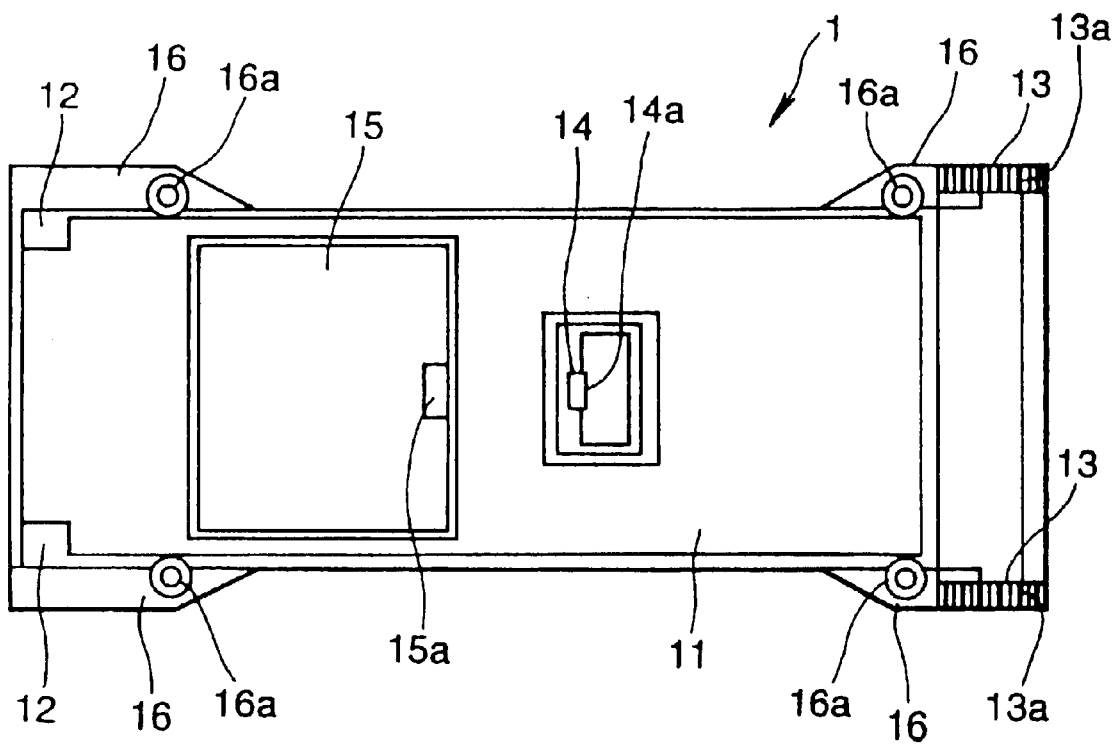
FIG. 9 is a plan view of a base member for constituting the pop-up unit.
Figure 10:
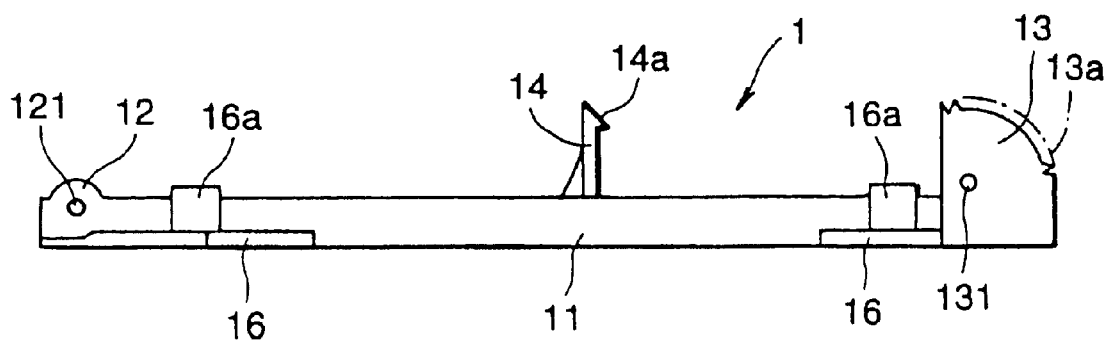
FIG. 10 is a side view thereof.
Figure 11:
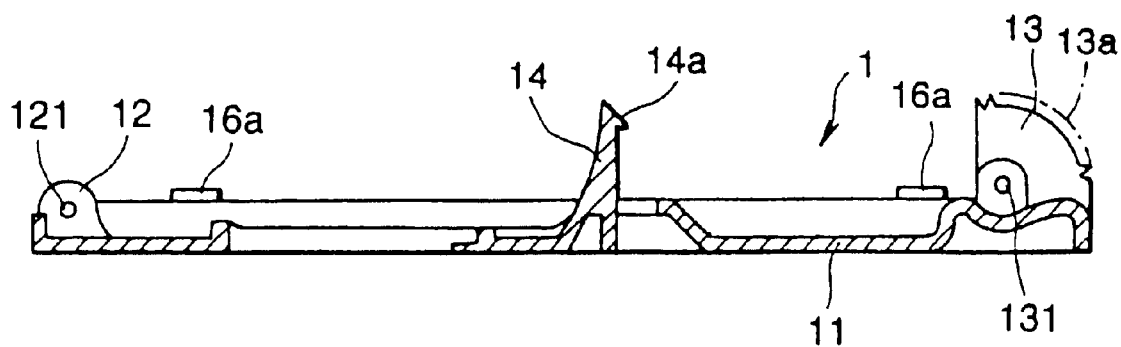
FIG. 11 is a sectional view thereof.
Figure 12:
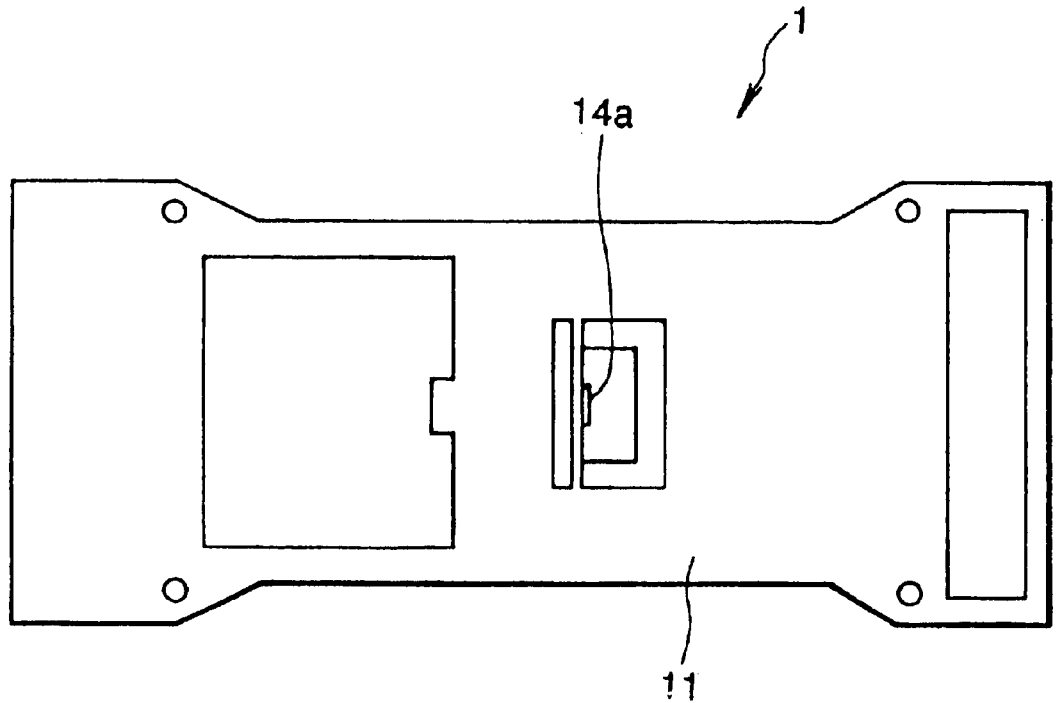
FIG. 12 is a bottom view thereof.
Figure 13:
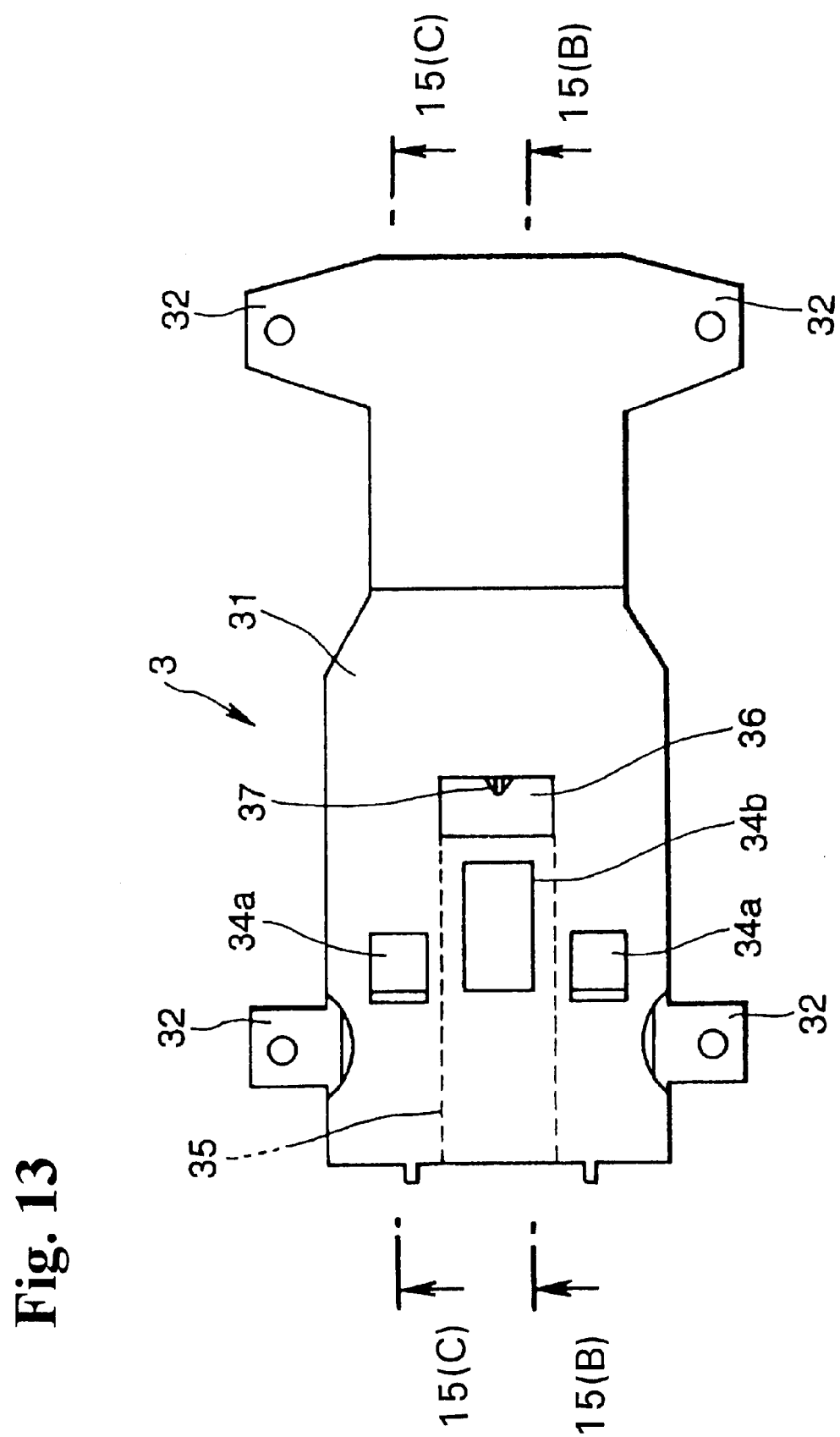
FIG. 13 is a plan view of an elevatable member for constituting the pop-up unit.

The poles 2a, 2b are collapsibly attached on the base member 1 by rotatably connecting the respective lower edge portions thereof to the front and rear edge portions of the base member 1. More specifically, as shown in FIGS. 5 and 6, the leg projecting portions 22a, 22b of the respective poles 2a, 2b are connected to the front leg connecting portions 12 and the rear leg connecting portions 13, as shown in FIGS. 9–11, through shafts, respectively, to thereby rotatably attach to the front and rear edge portions of the base member 1. In this case, a shaft member 4 connecting the front leg connecting portions 12 and the leg projecting portions 22a extends between the shaft holes 121 of the pair of the front leg connecting portions 12 provided on both front edge portions of the base member 1, and another shaft member 4 connecting the rear leg connecting portions 13 and the leg projecting portions 22b extends between the shaft holes 131 of the pair of the rear leg connecting portions 13 provided on both rear edge portions of the base member 1. The respective poles 2a, 2b are urged by torsion springs 41 provided to the respective shaft members 4 to stand up on the base member 1. Incidentally, the pinion gears 25b of the oil dampers 24b attached to both side surfaces of the rear pole 2b are engaged with the rack gears 13a formed on the rear leg connecting portions 13 of the base member 1, as shown in FIG. 1.

Figure 19A:
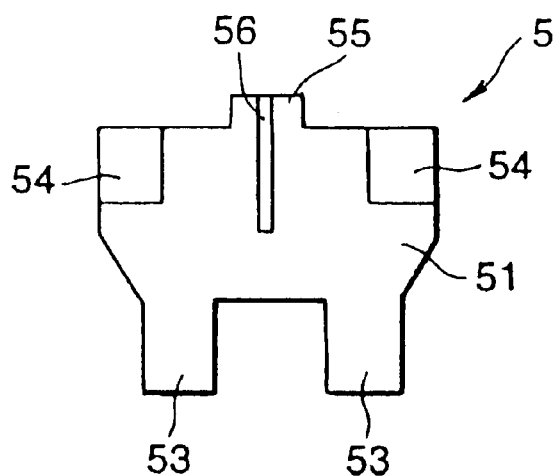
FIG. 19(A) is a plan view of a locking member for constituting the pop-up unit.
Figure 19B:
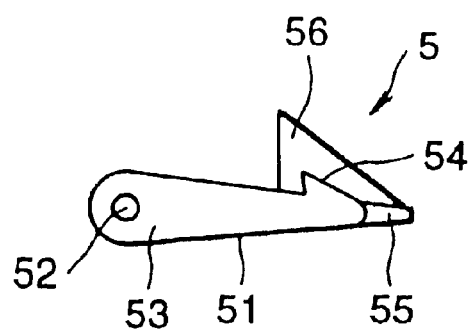
FIG. 19(B) is a side view thereof.

The locking member 5 is attached to the locking member connecting projections 24a of the front pole 2a. As shown in FIGS. 19(A) and 19(B), the locking member 5 includes a pair of connecting projections 53 with shaft holes 52, at one end of the base member 51 with a wedge-type section, to have a predetermined space therebetween; locking claws 54 projecting from both sides of the upper surface at the other end of the base member 51; a square projection 55 projecting from the center portion of the other end of the base member 51; and a cam projection 56 in a right-angle triangular shape extending from a forward end of the square projection 55 to an intermediate portion of the base member 51 on the upper surface side. Incidentally, the cam projection 56 is larger than the locking claws 54 in its length and height.

As shown in FIGS. 5 to 8, the connecting projections 53 of the locking member 5 are respectively inserted into the spaces for the locking member connecting projections 24a of the front poles 2a to be rotatable through the shaft on an inner side of the front pole 2a. The locking member 5 is urged upwards, i.e. to the side of the elevatable member 3, to rotate by the torsion spring 43 attached to a rotating shaft 42.

An approximately plate-shape elevatable member 3 is rotatably attached to upper end portions of both poles 2a, 2b.

As shown in FIGS. 13 to 15(C), the elevatable member 3 includes a plate-shape base member 31 bent at an intermediate portion thereof in an approximately crank shape; attaching pieces 32 having screw holes, respectively, at front and rear edges on both sides of the plate-shape base member 31 and extending outwards from the base member 31; and thick portions 33a, 33b of an approximately semi-circular section having shaft inserting holes 331a, 331b, respectively, provided to the front and rear edges on a lower surface side of the elevatable member 3.

Three engaging holes, i.e. locking depressions, 34a, 34b, 34a passing through from a surface side to a back side are provided in a row in a widthwise direction on a front portion of the plateshape base member 31, and the middle engaging hole 34b is formed longer than the other two engaging holes 34a in a longitudinal direction of the base member 31. Also, a bag-shape locking piece housing space 35 is provided at an intermediate portion in the widthwise direction on the front portion of the plate-shape base member 31 in the longitudinal direction thereof, and the engaging hole 34b crosses the locking piece housing space 35. Further, the front end of the locking piece housing space 35 opens at the front edge surface, and a portion from a slightly rear part from the foremost edge of the locking piece housing space 35 to the rear edge wall of the engaging hole 34b opens at the lower surface of the plate-shape base member 31. Also, a spring housing hole 36 passing from the surface side to the back side of the plate-shape base member 31 is formed on the rear edge of the locking piece housing space 35, and a spring supporting projection 37 projects from the rear edge wall of the spring housing hole 36.

Figure 14:
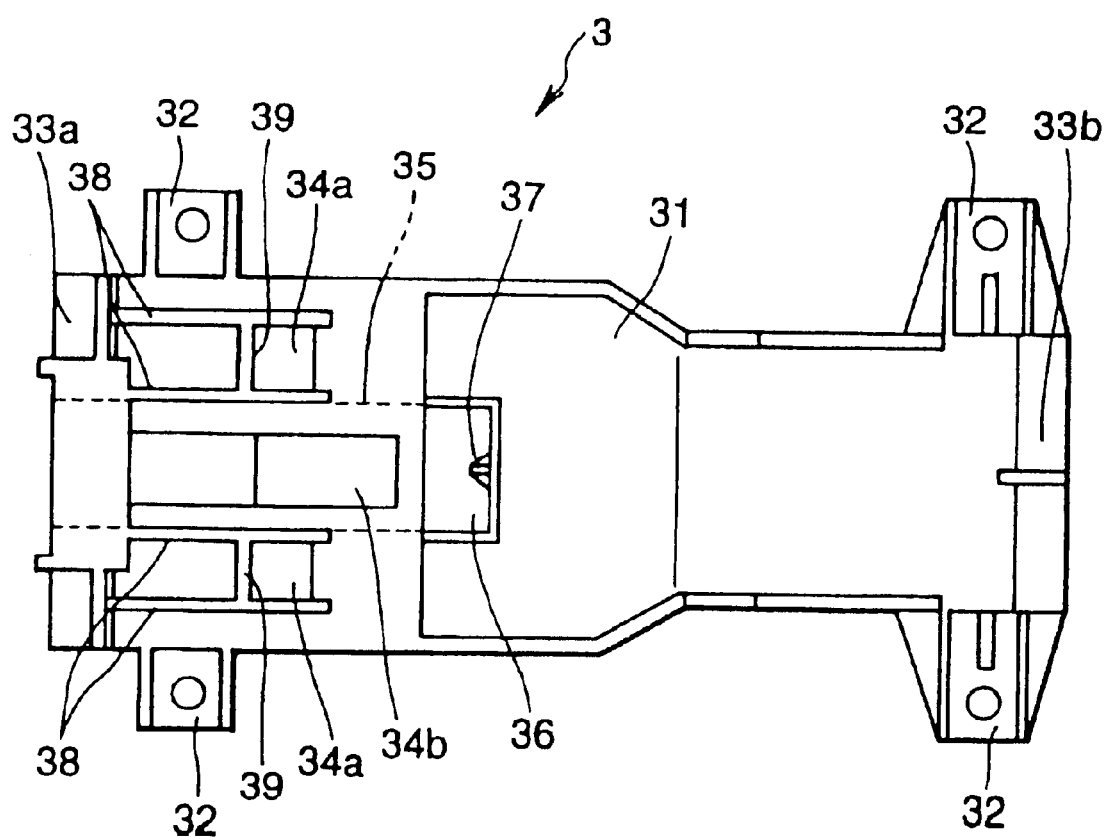
FIG. 14 is a bottom view thereof.
Figure 15A:
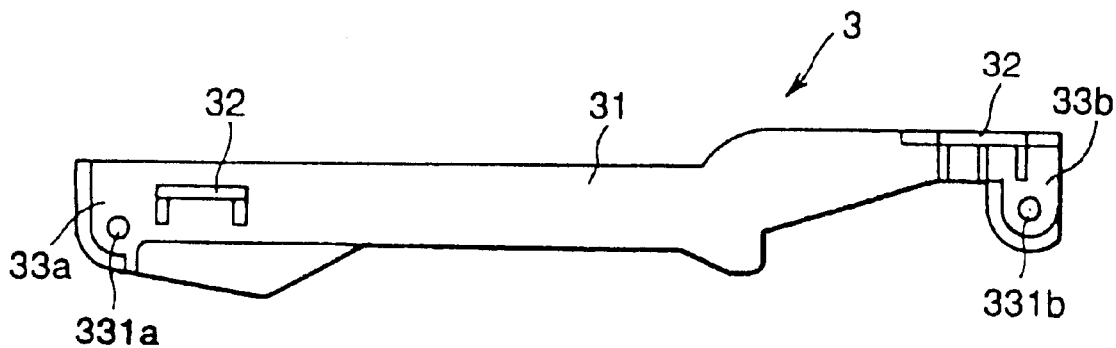
FIG. 15(A) is a side view thereof.
Figure 15B:
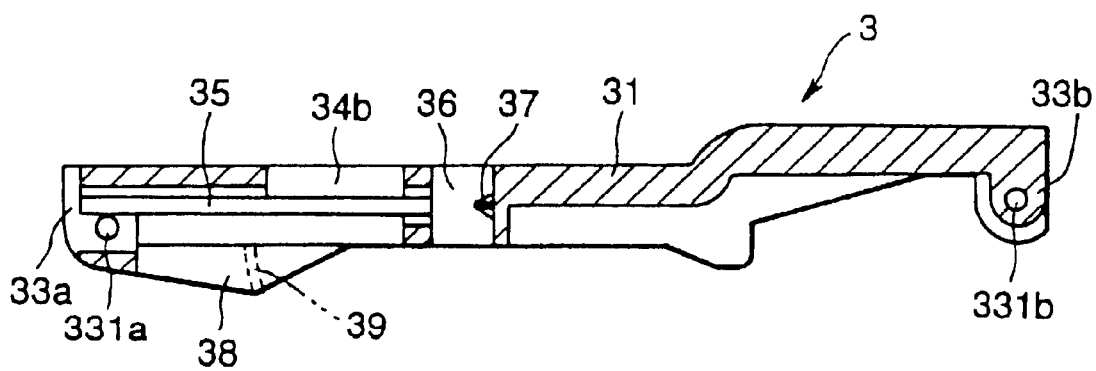
FIG. 15(B) is a sectional view taken along line 15(B)—15(B) in FIG. 13.
Figure 15C:
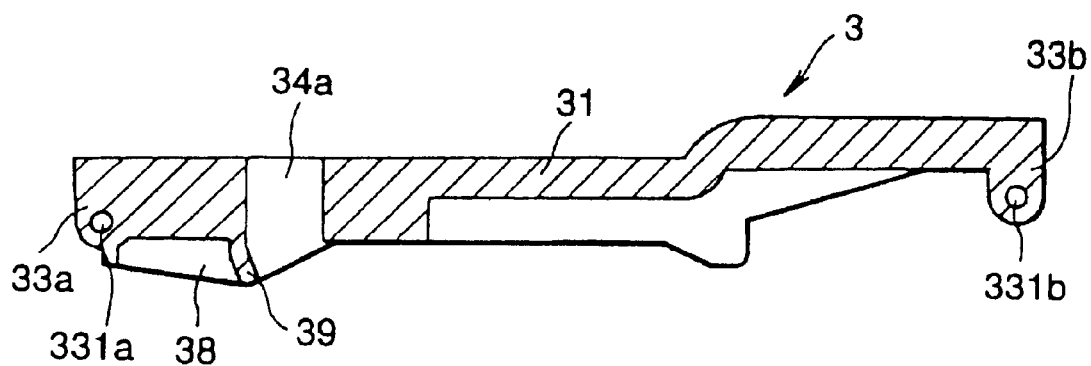
FIG. 15(C) is a sectional view taken along line 15(C)—15(C) in FIG. 13.

Also, two pairs of mount-shape projections 38, 38 to sandwich the engaging holes 34a are provided, as shown in FIG. 14, on the front edge portion of a lower surface of the plate-shape base member 31 for constituting the elevatable member 3, and locking walls 39 are formed to extend downwards from the inner surfaces at the front edges of the respective engaging holes 34a and to cross the interiors of the respective mount-shape projections 38 at the uppermost portion.

The elevatable member 3 is rotatably attached to the upper portions of both poles 2a, 2b such that the thick portions 33a, 33b, each having an approximately semi-circular section, provided on the front and rear portions of the elevatable member 3 are inserted between the elevatable member connecting projections 23a, 23a and 23b, 23b, respectively, and then connected by shafts 4a.

Here, a locking piece 6 is disposed to be slidable in the locking piece housing space 35 of the elevatable member 3.

Figure 16A:
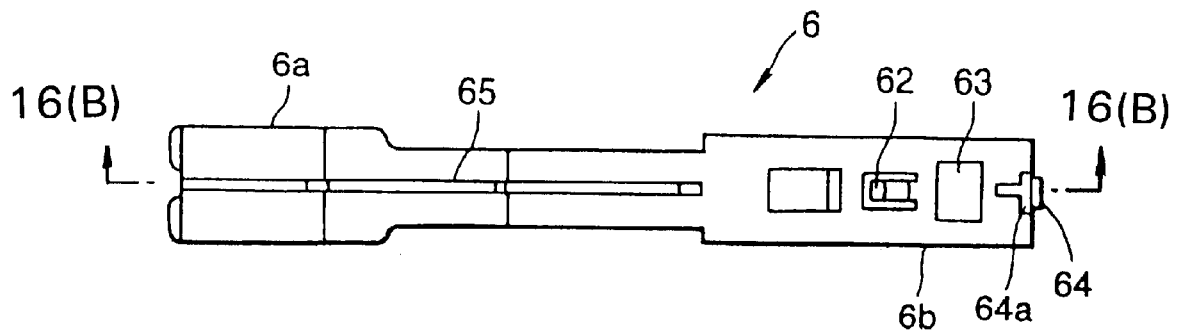
FIG. 16(A) is a plan view of a locking piece for constituting the pop-up unit.
Figure 16B:
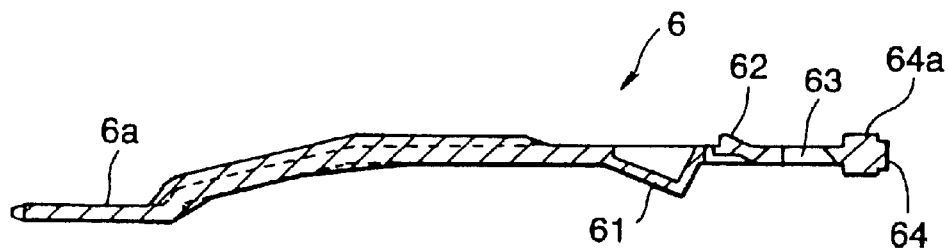
FIG. 16(B) is a sectional view taken along line 16(B)—16(B) in FIG. 16(A)
Figure 16C:
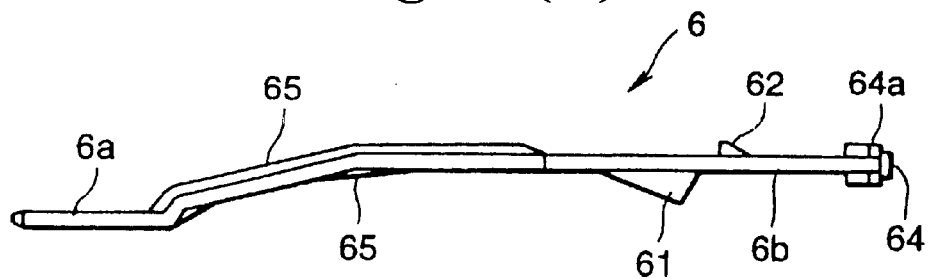
FIG. 16(C) is a side view thereof.

As shown in FIG. 16(A), the locking piece 6 is formed of wide edge portions at both sides and a slightly narrow intermediate portion integrally connected to the wide edge portions to form a long plate shape. The front wide portion, i.e. left side in the drawing, constitutes an operating portion 6a, and the rear wide portion, i.e. right side in the drawing, constitutes a locking portion 6b. On the locking portion 6b, an unlocking cum 61 extending on the lower surface side and having a mount-shape section, a small projection 62 extending on the upper surface side, and a locking hole 63 passing through from the upper surface to the lower surface are provided in this order from the front side to the rear side. Further, at the rear edge surface of the locking portion 6b, there is provided a spring attaching projection 64 to project rearwards through a circular pedestal 64a projecting to both upper and lower surface sides in a semi-circular form. Incidentally, reference numeral 65 in the drawing represents a reinforcing rib.

As shown in FIGS. 1 to 8, the locking piece 6 is attached to the elevatable member 3 and slidably housed in the locking piece housing space 35 of the elevatable member 3. At this time, the small projection 62 and the locking hole 63 of the locking piece 6 are positioned in the engaging hole 34b of the elevatable member 3, and the spring attaching projection 64 is positioned in the spring housing hole 36 of the elevatable member 3. A coil spring 44 is disposed between the spring attaching projection 64 and the spring supporting projection 37, so that the locking piece 6 is urged toward the front side and the small projection 62 abuts against a front edge portion of the engaging hole 34b to thereby define the sliding limit on the front side.

As described above, the pop-up unit of the present embodiment is formed of a four-point link mechanism including the base member 1; front and rear poles 2a and 2b; and the elevatable member 3, wherein through rotation of both poles 2a and 2b, the elevatable member 3 is elevated or lowered. In the pop-up unit according to the present embodiment, long plate-shape shielding plates 7 extend between both poles 2a and 2b on both sides thereof.

Figure 20A:
FIG. 20(A) is a plan view of a shielding plate for constituting the pop-up unit.
Figure 20B:
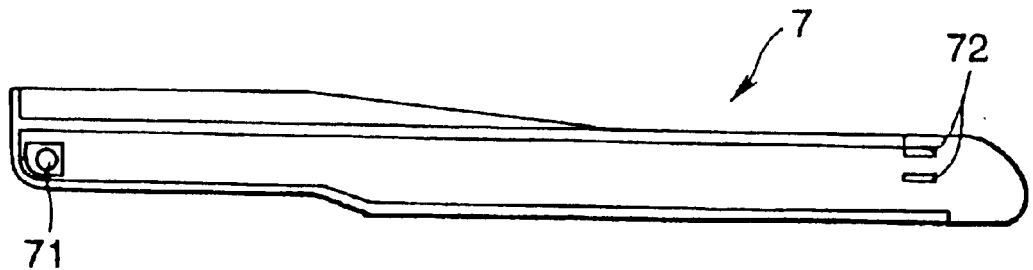
FIG. 20(B) is a rear view thereof.

As shown in FIG. 20(B), each shielding plate 7 is provided with an attaching projection 71 on one end and connecting bosses 72 on the other end, on a back or rear surface side thereof. Each shielding plate 7, as shown in FIG. 1, is disposed between the front and rear poles 2a, 2b such that the attaching projection 71 is rotatably connected to the shielding plate connecting boss 25a of the front pole 2a, and the shielding plate attaching projection 26b of the rear pole 2b is, rotatably and slidably in the front-rear direction, connected to the connecting bosses 72. Thus, the second link mechanism is formed of both shielding plates 7 and both poles 2a, 2b.

Incidentally, while the above-stated various members are subjected to weight reducing processes in order to save materials and to lighten the products, the lightened portions are omitted in the drawings.

Figure 3:
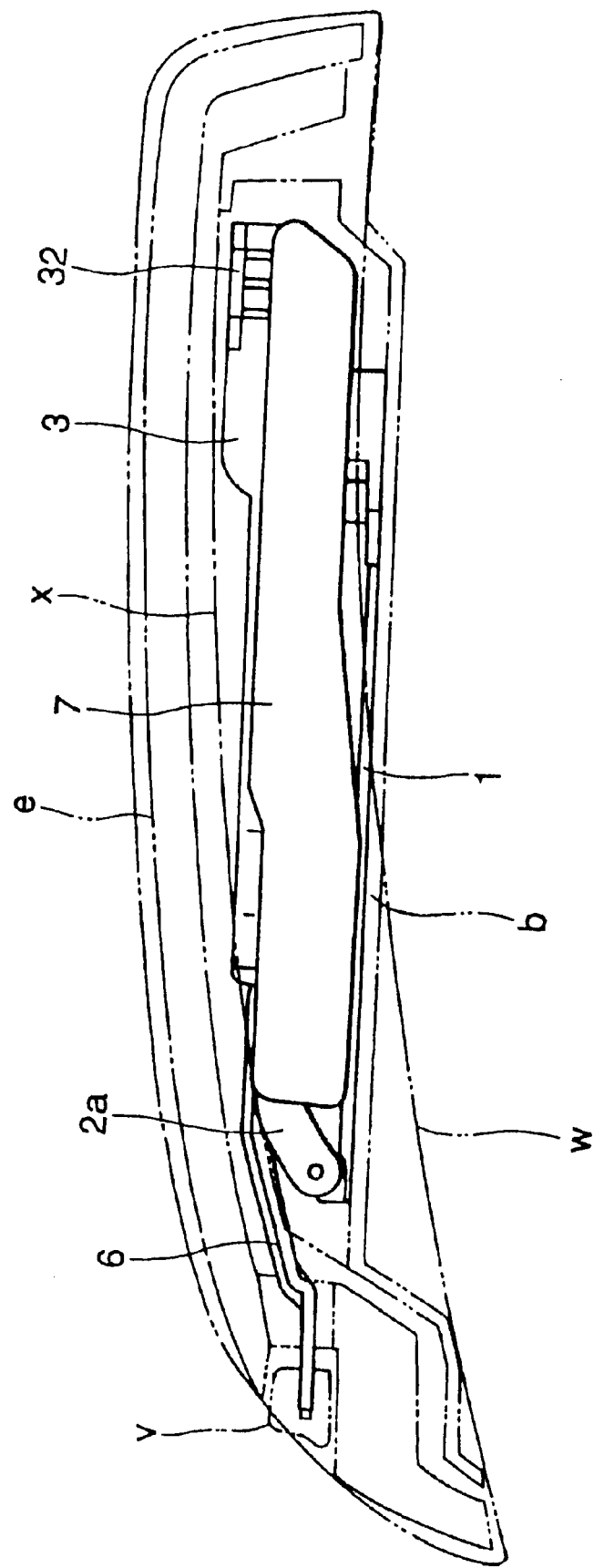
FIG. 3 is a side view showing the collapsed state.
Figure 4:
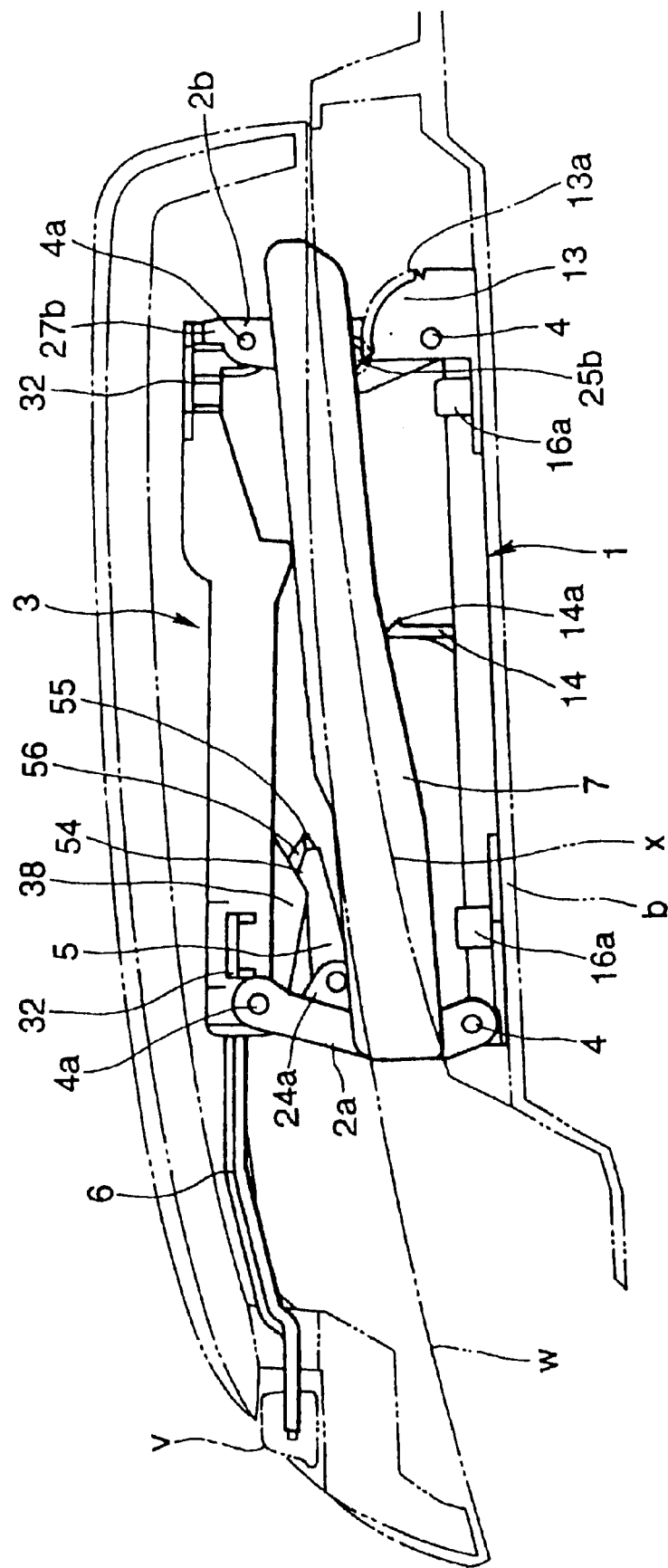
FIG. 4 is a side view showing the popped-up state.

The pop-up unit of the present embodiment, as described above, is built between the covering member b and the armrest e provided thereon, of the central console box a, as shown in FIG. 21. As shown in FIGS. 3 and 4, the base member 1 is positioned on the covering member k to be fixed thereto by driving screws or the like into bosses 16a of the base member 1, though not especially shown. Then, the armrest e is disposed on the elevatable member 3 and screws are provided in the armrest e through the screw holes of the attaching members 32 to be attached to the elevatable member 3, though not especially shown. Thus, the pop-up unit is built between the covering member b and the armrest e. At this time, the front edge portion of the locking piece 6 projects outside the armrest e from a through-hole provided to the front edge portion of the armrest e, and an operation button v or the like is attached thereto.

Ordinarily, as shown in FIG. 5, both poles 2a, 2b are collapsed on the base member 1 against the urging forces of the torsion springs 41 to be folded so that the locking claw 14a of the locking projection 14 is engaged with the locking hole 63 of the locking piece 6. (FIGS. 1, 3 and 5)

Figure 2:
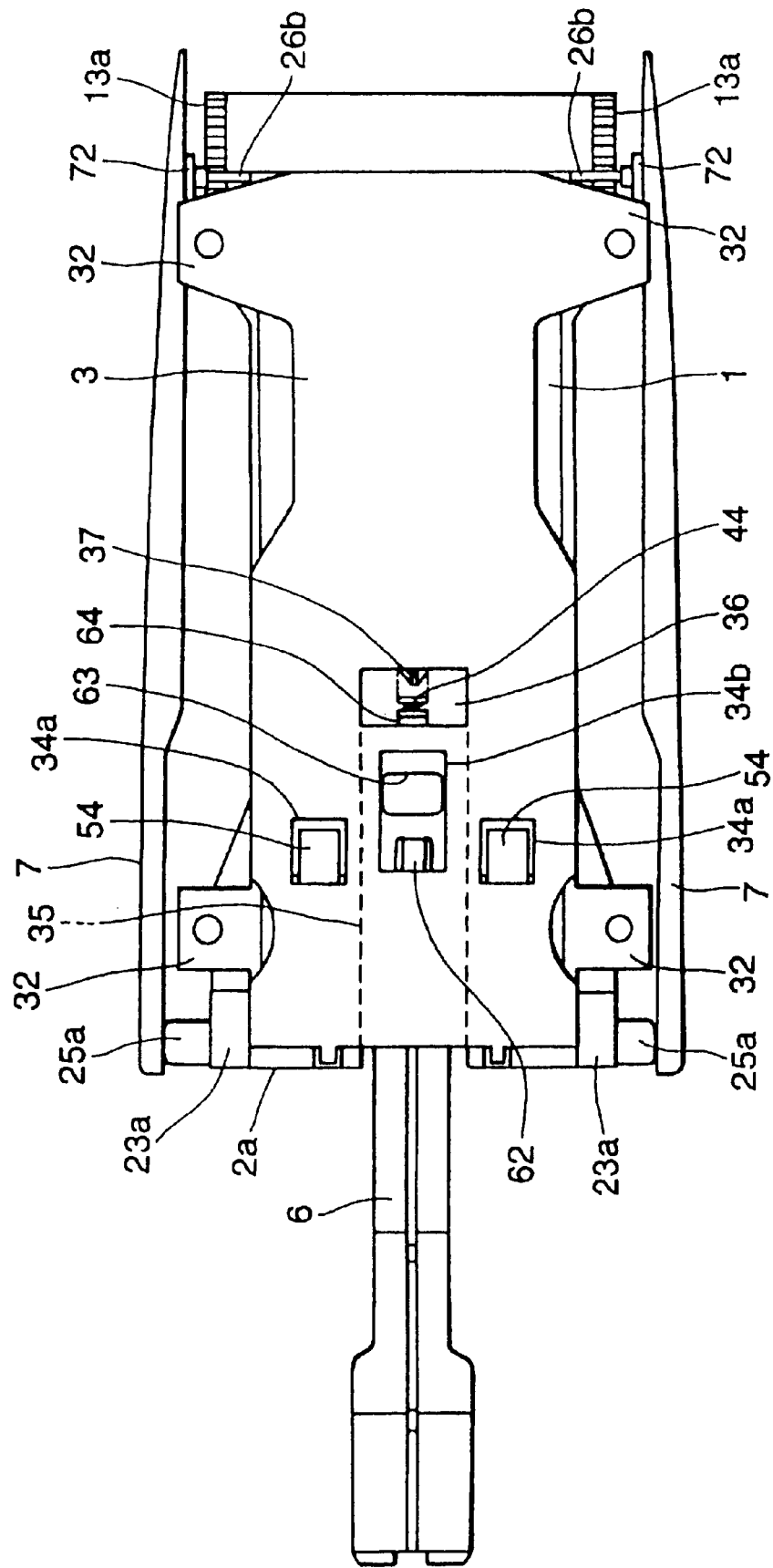
FIG. 2 is a plan view showing a popped-up state of the pop-up mechanism of the invention.
Figure 7A:
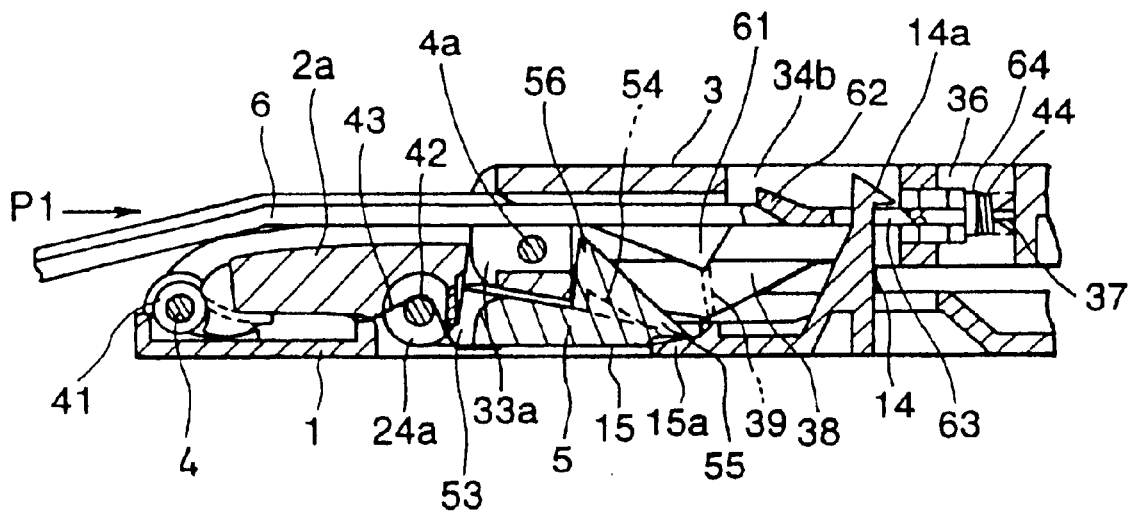
FIG. 7(A) is a partially enlarged sectional view for explaining intermediate movements from the collapsed state to the popped state.
Figure 7B:
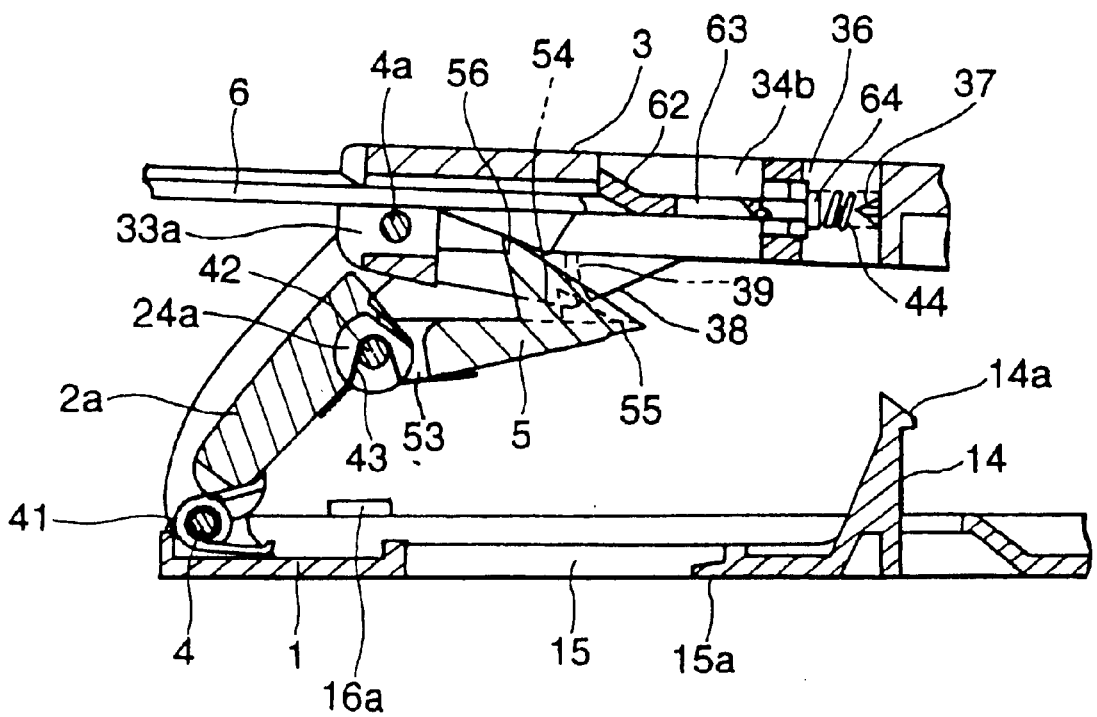
FIG. 7(B) is a partially enlarged sectional view for explaining the intermediate movements from the collapsed state to the popped-up state.

From this state, in case the pop-up unit is used as an armrest by elevating the elevatable member 3, the locking piece 6 is pushed (P1). As a result, as shown in FIG. 7(A), the locking piece 6 slides rearwards, i.e. to the right side in the drawing, to thereby release the engagement between the locking hole 63 of the locking piece 6 and the locking claw 14a of the locking projection 14 thus releasing the locking state of the pop-up unit. Thus, both poles 2a, 2b are rotated to the upright direction by the urging forces of the torsion springs 41, and the elevatable member 3 is elevated by actuation of the link mechanism. Then, as shown in FIG. 7(B), as the poles 2a and 2b rotate, the locking member 5 slides rearwards along the lower surface of the elevatable member 3 while rotating against the urging force of the torsion spring 43, and when it is rotated until both poles 2a and 2b stand straight, though not specially shown, the rotation terminating pieces 26a (refer to FIGS. 17(A) and 17(B)) and 27b (refer to FIGS. 18(A) and 18(B)) abut against the front edge and the rear edge of the elevatable member 3 to thereby terminate the rotations of both poles 2a and 2b. At the same time, the respective locking claws 54 of the locking member 5 cross over the locking walls 39 of the elevatable member 3 to engage therewith (refer to FIG. 6). Thus, as shown in FIGS. 2, 4 and 6, both poles 2a and 2b stand straight, and the elevatable member 3 is locked in the popped-up state elevated from the base member 1.

In this case, in the rotational movements of both poles 2a, 2b by the urging forces of the torsion springs 41, i.e. in association with the rotational movement of the rear pole 2b, since the pinion gears 25b of the dampers 24b are engaged with the rack gears 13a of the rear leg connecting portions 13 of the base member 1 to move while rotating, the rotation speeds of the poles 2a, 2b are reduced by the dampers 24b to thereby slowly rotate both poles 2a, 2b and to elevate the elevatable member 3 slowly. Also, as described above, the distance between the shaft insertion holes of the upper and lower edges of the front pole 2a is set to be longer than that of the rear pole 2b. Thus, when the pop-up unit is in the popped-up state where both poles 2a, 2b stand straight, the elevatable member 3 and the armrest e attached thereto are positioned to be higher at the front sides, so that the armrest e has an angle suitable as the passenger's armrest and is extremely suitable.

In case the elevatable member 3 is elevated for use as the armrest, in the pop-up unit according to the present embodiment, as shown in FIG. 4, a part of the space formed between the front and rear poles 2a, 2b at the popped-up state is covered from both surface sides by the shielding plates 7 provided between the front and rear poles 2a, 2b so that the space formed between a cover x of the covering member b and a cover w of the armrest e is closed by the shielding plates 7 at the popped-up state.

In other words, both end portions of the shielding plates 7 are rotatably connected to the intermediate portions of the respective front and rear poles 2a, 2b, which constitute a link mechanism with the shielding plates 7 and both poles 2a, 2b. Thus, when the pop-up unit is raised as the elevatable member 3 is elevated accompanying the standing-up rotational movements of both poles 2a, 2b, the space formed between the cover w of the armrest e and the cover x of the covering member b is closed at the popped-up state.

At this time, as described above, since the distances between the shaft inserting holes of the respective poles 2a, 2b are different, although the rotating distance of the shielding plate connecting bosses 25a of the front pole 2a and the rotating distance of the shielding plate attaching projections 26b of the rear pole 2b are different at the popped-up time. However, since the connecting boss 72 of the shielding plate 7 and the shielding plate attaching projection 26b of the rear pole 2b are slidably connected, the difference of the rotating distance can be absorbed by sliding of the connecting portion to thereby smoothly carry out the pop-up operation.

Figure 8A:
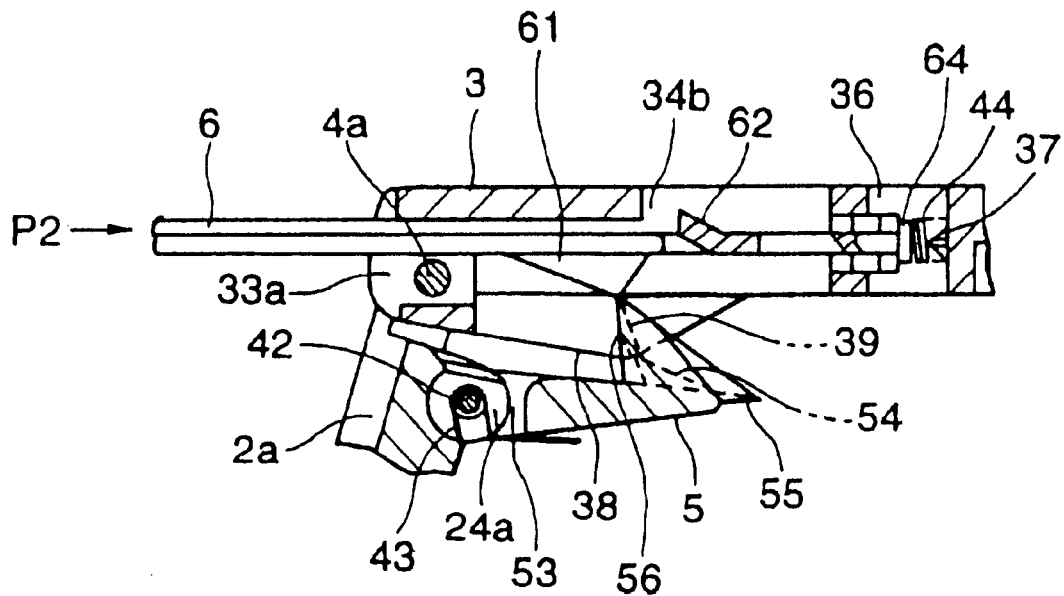
FIG. 8(A) is a partially enlarged sectional view for explaining the intermediate movements from the popped-up state to the collapsed state.

Further, in case the pop-up unit is returned to the collapsed state, as shown in FIGS. 1, 3 and 5, by lowering the elevatable member 3 from the popped-up state as shown in FIGS. 2, 4 and 6, the lock releasing piece 62 is again pushed (P2) as shown in FIG. 6, and the locking piece 6 slides rearwards, i.e. right side in the drawing as shown in FIG. 8(A). Thus, the unlocking cum 61 provided to the locking piece 6 is moved rearwards along the lower surface of the elevatable member 3 to thereby press downwards the cum projection 56 of the locking member 5 through the mutual cum actions. Thus, the locking member 5 is rotated downwards against to the urging force of the torsion spring 43 to release the engaging state of the respective locking claws 54 of the locking member 5 and the locking wall 39 of the elevatable member 3, and the locking state by the locking member 5 can be released.

Figure 8B:
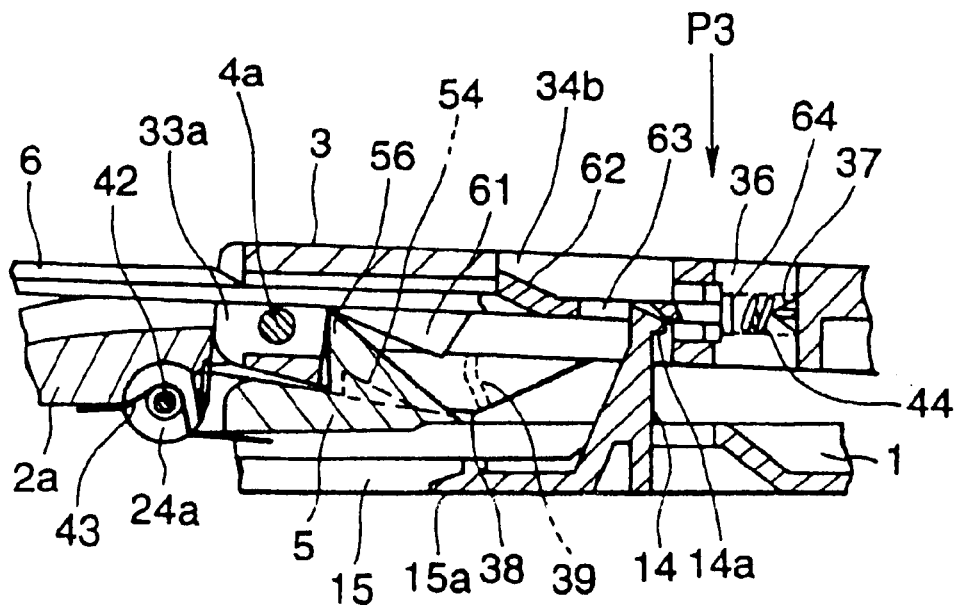
FIG. 8(B) is a partially enlarged sectional view for explaining explaining the intermediate movements from the popped-up state to the collapsed state.

Under this state, the elevatable member 3 is pushed downwards while both poles 2a, 2b are rotated rearwards through the action of the link mechanism to be collapsed; and as shown in FIG. 8(B), a tapered portion of the forward edge of the locking projection 14 of the base member 1 is allowed to abut against a tapered portion formed at the inner peripheral edge on the rear edge side of the locking hole 63 of the locking piece 6 having moved to the front portion, i.e. left side in the drawing, upon removal of the pressing force (P2). Under the state, by further pressing (P3) the elevatable member 3 to lower, the locking piece 6 is once slid rearwards through the action of both tapered portions; the forward edge of the locking projection 14 is inserted into the locking hole 63; thereafter, the locking piece 6 again slides forwards by the urging force of the coil spring 44; the locking claw 14a of the locking projection 14 engages the locking hole 63 as shown in FIG. 5; and the elevatable member 3 is locked in the collapsed state, as shown in FIGS. 1, 3 and 5.

At this time, in the pop-up unit according to the present embodiment, as shown in FIG. 3, the shielding plates 7 attached between the front and rear poles 2a, 2b are lowered together with the lowering movement of the elevatable member 3 accompanying the collapsing rotational movement of both poles 2a, 2b, so that the shielding plates 7 are positioned along the collapsed poles 2a, 2b to cover the side surfaces of the base member 1 and the elevatable to member 3 stacked thereon; and, in the present embodiment, the shielding plates 7 are housed in the covers x and w together with the base member 1 and the elevatable member 3. Incidentally, in the collapsing movement, in the same manner as in the popping-up movement as described before, also, since the connecting portion for connecting the connecting boss 72 of the shielding plate 7 and the shielding plate attaching projection 26b of the rear pole 2b slides in the approximately the front-rear direction, the collapsing movement can be smoothly carried out.

As described above, according to the pop-up unit of the present embodiment, in case the armrest e attached on the covering member b of the console box a is elevated or lowered, the shielding plates 7 are also elevated or lowered together with elevating or lowering movement of the elevatable member 3 accompanying the standing-up or collapsing movement of both poles 2a, 2b for elevating or lowering the elevatable member 3, to close the space formed between the cover w of the armrest e and the cover x of the covering member b when it is popped up. When it is collapsed, the shielding plates 7 are disposed along the collapsed poles 2a, 2b to be housed inside the cover w of the armrest e and the cover x of the covering member b.

Therefore, according to the pop-up unit of the present embodiment, even if the elevating height of the elevatable member 3 is taken greatly, since the space formed between the front and rear poles 2a, 2b at the popped-up state is covered by the shielding plates 7, the appearance of the pop-up unit at the popped-up state can be improved. Moreover, when it is collapsed, there is no risk of catching fingers and the like by poles or the like.

Incidentally, the pop-up structure of the present invention is not limited to the above-described structure, and shapes of the base member 1, elevatable member 3 and both poles 2a, 2b can be suitably changed according to mating members or the like. For example, in the above embodiment, the base member 1 is fixed to the covering member b of the central console a, and the armrest e is attached to the elevatable member 3. However, the covering member b of the central console a may be structured as a base member 1, and the elevatable member 3 may be structured as the armrest e. The locking device for performing locking and unlocking operations in the popping-up state and in the collapsed state is not limited to the structure using the locking member 5 and locking piece 6 in the present embodiment. The locking device may be changed to any suitable structure. Further, with regard to the damper, it may be different from the structure used in the present embodiment, or it may be omitted as the case may be. Regarding the other structures, also, they may be suitably changed provided that they do not exceed the scope of the present invention.

Furthermore, while the pop-up structure of the invention can be preferably adopted as the elevatable mechanism for the armrest formed on the central console box of the car, the pop-up structure is not limited thereto, and the pop-up structure of the present invention can be suitably applied to armrests of various chairs, or to the structures requiring change of a relative location wherein the relative location between a base member and a part attached thereto should be changed according to using conditions.

As described hereinabove, according to the pop-up structure of the invention, even if an elevating height of the elevatable member is taken greatly, since the space formed between the front and rear poles is covered at the popped-up state, the appearance of the armrest can be improved, and there is no risk of catching foreign materials when it is collapsed.

While the invention has been explained with reference to the specific embodiments of the invention, the explanation is illustrative and the invention is limited only by the appended claims.

What is claimed is:

1. A pop-up structure comprising:
    a base member;
    at least a pair of front and rear poles with upper and lower ends, said lower ends of said front and rear poles being rotatably connected to said base member so that the front and rear poles stand straight or are collapsed on the base member;
    an elevatable member rotatably attached to the upper ends of the front and rear poles;
    a locking device for locking the front and rear poles in a collapsed state where the front and rear poles are collapsed on the base member and in a popped-up state where the front and rear poles stand straight on the base member; and
    shielding plates rotatably connected to the front and rear poles, said shielding plates, in the popped-up state, covering at least a part of side portions between the front and rear poles.

2. A pop-up structure according to claim 1, wherein each of said shielding plates includes connecting portions, at least one of the connecting portions being rotatably connected to one of the front and rear poles and slidable in a front-rear direction.

3. A pop-up structure according to claim 2, wherein said connecting portions includes a rotatable connecting portion rotatably connected to one of the front and rear poles, and a slidable connecting portion slidably connected to the other of the front and rear poles.

4. A pop-up structure according to claim 3, wherein one of the front and rear poles includes a connecting boss engaging the rotatable connecting portion, and the other of the front and rear poles includes a projection slidably engaging the slidable connecting portion.

5. A pop-up structure according to claim 1, wherein said locking device includes a locking piece slidably situated adjacent the elevatable member and having a locking hole therein, a locking projection projecting upwardly from the base member to be engageable with an edge of the locking hole in the collapsed state, a locking member rotatably attached to the front pole and having a locking claw, and a locking wall formed in the elevatable member, said locking claw engaging the locking wall in the popped-up state so that when the locking piece is pushed in the popped-up state or collapsed state, a locating condition in the popped-up state or collapsed state is released.

6. A pop-up structure according to claim 5, wherein said base member includes a through window therein so that the locking member is located in the through window in the collapsed state to thereby reduce a height of the elevatable member in the collapsed state.

\* \* \* \* \*